United States Patent
Siagam et al.

(10) Patent No.: US 10,471,667 B2
(45) Date of Patent: Nov. 12, 2019

(54) PREFORM STATION AND METHOD

(71) Applicants: Airbus Operations GmbH, Hamburg (DE); Airbus SAS, Blagnac (FR)

(72) Inventors: Paulin Fideu Siagam, Hamburg (DE); Hauke Seegel, Hamburg (DE); Claus Fastert, Hamburg (DE); Bernard Duprieu, Toulouse (FR); Axel Siegfried Herrmann, Hamburg (DE)

(73) Assignees: AIRBUS OPERATIONS GMBH, Hamburg (DE); AIRBUS SAS, Blagnac (FR)

( * ) Notice: Subject to any disclaimer, the term of this patent is extended or adjusted under 35 U.S.C. 154(b) by 490 days.

(21) Appl. No.: 14/491,384

(22) Filed: Sep. 19, 2014

(65) Prior Publication Data
US 2015/0084237 A1 Mar. 26, 2015

(30) Foreign Application Priority Data

Sep. 20, 2013 (EP) .................................. 13185372

(51) Int. Cl.
*B29C 70/28* (2006.01)
*B29C 51/10* (2006.01)
(Continued)

(52) U.S. Cl.
CPC .............. *B29C 70/28* (2013.01); *B29B 11/16* (2013.01); *B29C 33/302* (2013.01);
(Continued)

(58) Field of Classification Search
CPC ... B29C 43/361; B29C 33/308; B29C 33/302; B29C 33/307; B29C 33/02;
(Continued)

(56) References Cited

U.S. PATENT DOCUMENTS 3,596,869 A * 8/1971 Humphrey .............. B28B 7/025
249/155
6,484,776 B1 * 11/2002 Meilunas .............. B29C 70/386
156/213
(Continued)

FOREIGN PATENT DOCUMENTS

DE 102011116119 A1 4/2013
WO 2006048652 A1 5/2006
WO WO2006/048652 A1 * 5/2006

OTHER PUBLICATIONS

European Patent Office, Extended European Search Report for European Patent Application No. 13185372.3 dated Jun. 17, 2014.
(Continued)

*Primary Examiner* — Joseph S Del Sole
*Assistant Examiner* — Ninh Le
(74) *Attorney, Agent, or Firm* — Lorenz & Kopf LLP

(57) ABSTRACT

A preform station for forming a flexible semi-finished product and for transforming a flexible semi-finished product into a geometrically stable preform is provided. The preform station comprises a first pin array having a multitude of pins, on which the semi-finished product can be draped. Furthermore, the pins are movable along their longitudinal directions in order to form the flexible semi-finished product. Furthermore, the preform station comprises an activation device for activating a binder of the semi-finished product such that the semi-finished product can be transformed into the geometrically stable preform.

13 Claims, 10 Drawing Sheets

(51) Int. Cl.
    B29C 33/30      (2006.01)
    B29C 43/36      (2006.01)
    B29B 11/16      (2006.01)
    B29C 67/00      (2017.01)
    B29C 33/02      (2006.01)
    B29K 105/08     (2006.01)

(52) U.S. Cl.
    CPC .......... B29C 33/307 (2013.01); B29C 33/308 (2013.01); B29C 43/361 (2013.01); B29C 51/10 (2013.01); B29C 67/0011 (2013.01); B29C 33/02 (2013.01); B29C 2043/3621 (2013.01); B29C 2043/3626 (2013.01); B29C 2043/3636 (2013.01); B29K 2105/0872 (2013.01)

(58) Field of Classification Search
    CPC .......... B29C 44/585; B29C 2043/3621; B29C 2043/3626; B29C 2043/3623; B29C 2043/3636; B29C 43/36; B29C 43/52; B29C 51/10; B29C 51/36; B29C 70/28; B29C 67/0011; B28B 7/025; B23Q 1/035; B23Q 1/28; B23Q 1/287; G05B 2219/49025; B29B 11/16; B29K 2105/0872; B32B 38/1866; B32B 37/00; Y10T 156/1028
    See application file for complete search history.

(56) References Cited

U.S. PATENT DOCUMENTS

| | | | |
|---|---|---|---|
| 6,890,470 B2 | 5/2005 | Staub et al. | |
| 7,731,207 B2* | 6/2010 | Santos Gomez | B64F 5/50 280/408 |
| 7,997,891 B2 | 8/2011 | Gallagher et al. | |
| 2004/0262816 A1* | 12/2004 | Parks | B29C 43/36 264/500 |
| 2009/0108491 A1* | 4/2009 | Frayne | B29C 33/302 264/226 |
| 2014/0175704 A1 | 6/2014 | Eberdt et al. | |

OTHER PUBLICATIONS

Simon, D., et al., "Verformte Kunststoffscheiben auf flexiblem Formwerkzeug herstellen," Maschine N Markt, Das Industrie Portal, written Jun. 22, 2012 and retrieved from http://www.maschinenmarkt.vogel.de/themenkanaele/produktion/umformtechnik/articles/368921/index2.html on Jun. 6, 2013.

* cited by examiner

PREFORM STATION AND METHOD

CROSS-REFERENCE TO RELATED APPLICATION

This application claims priority to European Patent Application No. 13 185 372.3, filed Sep. 20, 2013, which is incorporated herein by reference in its entirety.

TECHNICAL FIELD

The technical field relates to a preform station and to a method for draping a flexible semi-finished product and for transforming the flexible semi-finished product into a geometrically stable preform.

BACKGROUND

Components of an aircraft may be built of flexible semi-finished products by draping sheets of flexible semi-finished product over a mold. Therefore, a mold having a shape which corresponds to the desired shape of the component may be required.

Thus, a mold which has the desired shape may have to be provided for every different component. Moreover, the semi-finished product may have to be draped by hand onto the mold and also the subsequent manufacturing steps, for example the cutting, may be carried out by hand. Furthermore, it may be necessary to fix the semi-finished product onto a final mold.

DE 102 10 517 B3 and U.S. Pat. No. 6,890,470 B2 describe methods for manufacturing a fiber composite structural component having a given contour by using a mold.

In addition, other objects, desirable features and characteristics will become apparent from the subsequent summary and detailed description, and the appended claims, taken in conjunction with the accompanying drawings and this background.

SUMMARY

One of various aspects of the present disclosure relates to a preform station for draping a flexible semi-finished product and for transforming the flexible semi-finished product into a geometrically stable preform. The preform station comprises a first pin array comprising a multitude of pins, on which the flexible semi-finished product can be draped. Each pin has a longitudinal direction and is movable along the longitudinal direction for forming the flexible semi-finished product. Furthermore, the preform station comprises a binder activation system for activating a binder of the flexible semi-finished product when the flexible semi-finished product is draped onto the first pin array, thereby transforming the flexible semi-finished product into the geometrically stable preform.

This may provide for an efficient way to produce large components comprising of draped semi-finished products.

In other words, the preform station may provide a tool for an automatic forming and consolidation of the draped semi-finished product. Furthermore, the preform station may also provide for a precisely controllable and repeatable forming and consolidation process. Thus, forming and consolidation of the semi-finished product can be performed precisely such that a precise component can be manufactured with the semi-finished product. The preform station may also provide for a continuous forming the semi-finished product from a substantially flat initial shape (i.e. form) to a 3-dimensional geometry. By precisely controlling the forming and activation/consolidation process, angles of fibers of the semi-finished product may be precisely adjusted.

The flexible semi-finished product may refer to a textile semi-finished product, a woven semi-finished product, a semi-finished product with uni-directional fibers, a carbon fiber material, a semi-finished product comprising dry fiber reinforcements and/or a pre-impregnated fiber. Furthermore, the semi-finished product may comprise a binder, for example, a glue, an impregnation and/or a resin. Furthermore, the semi-finished product is flexible before it is applied onto the preform station. In other words, the binder of the semi-finished product may not be activated and/or consolidated before or even when draping the semi-finished product. It should be noted, however, that the preform station may be adapted for consolidating selected regions of the flexible, semi-finished product during the draping process.

The transformation of the flexible semi-finished product into the geometrically stable preform may comprise the steps of forming the flexible semi-finished product and the step of activating the binder of the flexible semi-finished product. Activation of the binder initiates a consolidating of the semi-finished product. The semi-finished product may be partly consolidated such that it is already geometrically stable but may need some more time to completely cure. When the binder of the semi-finished product is activated, the semi-finished product is not flexible anymore and is thus transformed into a geometrically stable preform. The geometrically stable preform may refer to a preform that is preservative with respect to configuration and/or invariant with respect to configuration. Moreover, the term "geometrically stable" may refer to the bend-proof and/or rigid property of the preform. The preform may then be transported away from the preform station without changing its shape substantially. In other words, a "geometrically stable preform" may refer to a semi-finished product, whose binder is activated and/or which semi-finished product is at least partly consolidated, respectively. Moreover, the consolidated semi-finished product may also denote the cured semi-finished product.

By activating the binder with the binder activation system the semi-finished product can be transformed into a geometrically stable preform without disturbance of the fiber architecture.

With the preform station described above and in the following, the forming process of the flexible semi-finished product and/or the activating/consolidating process of the binder of the flexible semi-finished product can be precisely controlled. Thus, with the preform station, preforms can be precisely manufactured. Furthermore, the manufacturing process is also reproducible, i.e. repeatable or adjustable, such that a multitude of preforms having the same or slightly different properties can be manufactured.

According to an embodiment of the present disclosure, all pins of the first pin array are parallel to each other. In other words, each pin comprises a longitudinal direction the longitudinal directions of the pins are parallel to each other.

However, not all pins of the first pin array need to be parallel to each other. For example, a first pin and a second pin of the first pin array may enclose an angle that lies between about 10° and about 30°. This could be advantageous for manufacturing preforms having a complex geometry, and/or a large curvature.

The preform station may be designed to manufacture preforms that have a curvature of 180° or even more, in one or even two dimensions. Furthermore, the preform station may be designed to manufacture large preforms. For example, the preform station may be designed to manufacture a preform that has an extension of about 10 m-about 30 m. Thus, half-shells or even spherical elements can be produced.

The preforms manufactured with the preform station could be used to build fuselage panels, wing covers, horizontal and vertical stabilizers, and horizontal wing boxes or other structural elements of an aircraft.

The distances between two adjacent pins of the first array may be variable. On the one hand, the distances between two adjacent pins may be sufficient to avoid a bending of the preform between the two adjacent pins. On the other hand, the distance between two adjacent pins may be large enough in order to reduce the number of pins in order to avoid excessive weight and handling effort. In one example, the distance between two adjacent pins may lie between about 15 mm and about 60 mm. For example, a distance between about 15 mm and about 60 mm may be preferable for materials with sufficient weight per area that are made by more than one ply. Furthermore, the distances between the pins can vary. For example, in regions with a small curvature radius the distance between adjacent pins may be relatively small and in regions with a large curvature radius the distance between adjacent pins may be relatively large.

The first pin array may comprise 100 times 100 pins. The number of pins may depend on the size and/or the geometry of the component to be manufactured. For example, for manufacturing large components, the first pin array may comprise 1000 times 1000 pins.

The preform station may also comprise a vibration device for inducing a vibration of the semi-finished product. The vibration of the semi-finished product may support the draping process.

The preform station may also include a cutting device such that the steps of draping, forming, cutting and consolidating the semi-flexible product may carried out by the preform station.

According to an embodiment of the present disclosure, the binder activation system comprises a heating device, an ultrasound emitting device or a fan.

The heating device, the ultrasound emitting device and/or the fan may be configured to activate a binder of a flexible semi-finished product. For example, the binder may be activated by applying heat to the binder. In this case, the binder activation system may comprise a heating device.

According to an embodiment of the present disclosure, the binder activation system comprises at least one binder activation device that is associated with a pin of the first pin array. For example, the binder activation device is integrated in the respective pin.

Hereby, the term "associated with" may imply that the pin is connected to a binder activation device, that a binder activation device is attached to the pin or that the pin comprises a binder activation device.

Moreover, each or at least a plurality of pins of the multitude of pins may be associated to a binder activation device. For example, each pin of the first pin array may be associated with a separate binder activation device.

For example, a first pin of the first pin array is associated with a first binder activation device and a second pin of the first pin array is associated to a second binder activation device. Thus, the binder of a first region of the semi-finished product can be activated separately from the binder of a second region of the semi-finished product.

According to an embodiment of the present disclosure, each pin of a first group of pins includes an activation device for activating the binder of the semi-finished product. Furthermore, the first group of pins comprises a first subgroup of pins and a second subgroup of pins. Moreover, the activation devices of the first subgroup of pins are controllable independently of the activation devices of the second subgroup of pins such that the binder of the semi-finished product in the region of the first subgroup of pins and the binder of the semi-finished product in the region of the second subgroup of pins can be activated independently. The preform station is adapted to activate the activation devices of the first subgroup of pins in order to activate the binder of the first region of the semi-finished product and to subsequently activate the activation devices of the second subgroup of pins in order to activate the binder of the second region of the semi-finished product.

In this way different regions of the binder of the flexible semi-finished product may be activated at different times and/or in different stages of the manufacturing process. Thus, the binder of the semi-finished product may be iteratively activated. This provides for a precisely controllable activation process of the binder and/or consolidating process of the semi-finished product. Thus, the semi-finished product and/or preform may be shaped by controlling the activation of the binder.

According to an embodiment of the present disclosure, a first pin of the first pin array comprises an actuator for moving the first pin along the longitudinal direction.

The term "actuator" may refer to a motor, a gear, a camshaft or any other device which is adapted to move the first pin along the longitudinal direction.

Furthermore, each pin of a multitude of pins may comprise such an actuator for moving the respective pin along the longitudinal direction.

The actuators may be controlled analogously to a display device. Each pin may refer to a pixel and the position of each pin may refer to the color value of the respective pixel. Thus, positions of pins may be defined as a plurality of pixels, wherein each pixel has a color value.

Thus, the preform station may also comprise a means for moving pins along the longitudinal direction. Thus, the forming process, which is connected to the movement of the pins, may be carried out automatically.

According to an embodiment of the present disclosure, a second pin of the first pin array is coupled to the first pin such that the second pin moves together with the first pin when the first pin is moved. Furthermore, the second pin is fixable independently of the first pin.

In other words, the movement of the second pin may be defined by the first pin. However, the second pin may be fixed independently of the first pin and may thus be fixed at the different position than the first pin.

According to an embodiment of the present disclosure, a pin of the first array of pins comprises a device for fixing the pin to a specific position along the longitudinal direction of the pin.

According to an embodiment of the present disclosure, at least one pin of the first pin array comprises a cap, which is connected to an end of the at least one pin.

According to an embodiment of the present disclosure, the binder of the semi-finished product may be activated independently of the pins by means of contactless activation devices, e.g. an infrared heating device, a hot gas heating device, an ultrasound device, and any combination thereof. This may be combined with vacuum bagging. This embodiment may be suitable for large and thin structures with low mass and therefore with a short, high-convective cooling rate. However, this embodiment may also be applicable for other kinds of structures.

For example, the cap is pulled over an end of the at least one pin. The end of the at least one pin may refer to an end portion of the at least one pin. Moreover, each pin of the first pin array may comprise a cap, which is connected to an end of the respective pin. The cap may have a size between about 5 mm and about 20 mm. In one example, the cap has a size between about 8 mm and about 12 mm.

The shape of the cap may correspond to a geometry to which the semi-finished product is to be formed. For example, in regions, where the semi-finished product shall comprise a curvature, the respective cap may be shaped as a semicircle. However, in regions, where the semi-finished product shall be substantially flat, the cap may be shaped as a disk.

Furthermore, the cap may be removably connected to the at least one pin. In this way, the cap is replaceable by another cap such that different caps can be connected to the pin corresponding to the geometry to which the semi-finished product is to be formed.

According to an embodiment of the present disclosure, a first pin of the first pin array comprises a first cap and a second pin of the first pin array comprises a second cap. Furthermore, the first cap has a different shape than the second cap, wherein the shape of the first cap and the shape of the second cap correspond to a geometry to which the semi-finished product is to be formed.

In other words, the first cap of the third pin and the second cap of the fourth pin may have a shape such that the geometry may be manufactured more precisely. Thus, the shapes of the caps may be individually and precisely selected and each cap may be connected to the respective pin based on the geometry to which the semi-finished product is to be formed.

According to an embodiment of the present disclosure, a pin of the first pin array comprises a cap that changes its shape, if the cap is heated to a specific temperature.

For example, the cap may change its shape, if the cap is heated to 80° C. When the temperature of the cap is below 80° C., the cap may for example have a shape of a flat disk. When the cap is heated to 80° C., the cap may change its shape to the shape of a semicircle.

Thus, the shape of the cap can be different for different steps in the manufacturing process. This may enable a more flexible and more precise manufacturing process of components and/or of preforms.

According to an embodiment of the present disclosure, a third pin of the first pin array comprises a fixation device for fixing the semi-finished product to the third pin.

In other words, a point and/or a region of the semi-finished product can be fixed to the fifth pin such that the point and/or region does not move with respect to the fifth pin. For example, the fixation device may be positioned on the end of the fifth pin, on which the semi-finished product is to be placed. Thus, the position of the semi-finished product may be fixed with respect to the fifth pin such that the semi-finished product may be fixed in this position until the binder is activated.

The fixation device may be a suction device that sucks the semi-finished product in order to fix the semi-finished product to the fixation device. The fixation device may also be a freezing device that first applies water to a region of the semi-finished product and fixes the semi-finished product by freezing the water. Moreover, the fixation device may be a needle gripper or an electro adhesive gripper.

According to an embodiment of the present disclosure, each pin of a multitude of pins of the first pin array comprises a fixation device, respectively.

According to an embodiment of the present disclosure, each pin of a first group of pins includes a fixation device for fixing the semi-finished product to the respective pin. The first group of pins comprises a first subgroup of pins and a second subgroup of pins. Fixation devices of the first subgroup of pins are controllable independently of the fixation devices of the second subgroup of pins such that the semi-finished product can be fixed to the first subgroup of pins and to the second subgroup of pins independently of each other. Furthermore, the preform station is adapted to activate the first subgroup of pins to fix a first region of the semi-finished product and to subsequently activate the second subgroup of pins to fix a second region of the semi-finished product.

In other words, the fixation devices of the first subgroup of pins and of the second subgroup of pins are independently controllable such that the semi-finished product can be iteratively fixed based on a geometry to which the semi-finished product is to be formed.

For example, different regions of the semi-finished product may be processed in different stages of the manufacturing process. The region of the semi-finished product, which is to be processed, can be fixed and processed separately. In this way an iterative fixation process may be defined. The iterative fixation process may correspond to an iterative activation process of the binder of the semi-finished product described within this application. Thus, an iterative manufacturing process of preforms may be provided.

According to an embodiment of the present disclosure, a pin of the first pin array comprises a gliding device such that the semi-finished product and/or preform can glide over the respective pin. For example, the gliding device may be a nozzle for compressed air, which generates an air cushion, on which the semi-finished product can glide.

According to an embodiment of the present disclosure, a flexible membrane is installed on and/or between the pins of the first pin array. In this way, discrete differences between pins are continuously transferred to the semi-finished product.

According to an embodiment of the present disclosure, the preform station further comprises a first preform module comprising the first pin array and a second preform module comprising a second pin array. The second pin array comprises a multitude of pins, on which the flexible semi-finished product can be draped. Furthermore, the first preform module and the second preform module are movable with respect to each other.

In other words, the preform station has a modular design, wherein the modules of the preform station may be adjusted with respect to each other. Thus, for forming complex shapes the different modules may be placed such that the desired shape can be manufactured. The pins of the first pin array may be parallel to each other and the pins of the second pin array may also be parallel to each other. For example, the pins of the first module and the pins of the second module may have an angle to each other.

According to an embodiment of the present disclosure, the pins of the first preform module face the pins of the second preform module such that the semi-finished product and/or the preform are positionable between the pins of the first preform module and the pins of the second preform module.

In other words, the semi-finished product and/or the preform can be sandwiched between the pins of the first preform module and the pins of the second preform module.

Thus, the semi-finished product may be shaped by the pins from both sides of the semi-finished product. Furthermore, the pins of the first preform module and the pins of the second preform module may both comprise a binder activation device. Thus, the binder of the semi-finished product may be activated from both sides of the semi-finished product. By providing pins on both sides of the semi-finished product, the semi-finished product can be shaped into more complex geometries. Furthermore, since the binder can be activated from both sides of the semi-finished product, the binder can be more uniformly and faster activated.

One of various aspects of the present disclosure relates to a method for transforming a flexible semi-finished product into a geometrically stable preform. The method comprises draping the flexible semi-finished product onto a first pin array of a preform station, which is described within this application. Furthermore, the binder of the semi-finished product is activated by means of the binder activation system of the preform station.

The methods described here and in the following may be carried out by the preform stations described in the present application. Furthermore, the preform stations described herein may be configured to carry out any method described in this application.

According to an embodiment of the present disclosure, the method further comprises fixing the semi-finished product to at least one pin by means of a fixation device, which is described within this application.

According to an embodiment of the present disclosure, the method further comprises fixing a first region of the semi-finished product to a first group of pins and of draping the first region of the semi-finished product. Furthermore, the method comprises fixing a second region of the semi-finished product to a second group of pins and draping the second region of the semi-finished product.

It has to be noted that the embodiments of the present disclosure are described with reference to different subject-matters. Some embodiments are described with reference to the preform station, whereas other embodiments are described with reference to the method. However, a person skilled in the art will gather from the above and the following description that unless other notified in addition to any combination of features belonging to one type of subject-matter, also any combination between features relating to different subject-matter is considered to be disclosed within this application.

A person skilled in the art can gather other characteristics and advantages of the disclosure from the following description of exemplary embodiments that refers to the attached drawings, wherein the described exemplary embodiments should not be interpreted in a restrictive sense.

BRIEF DESCRIPTION OF THE DRAWINGS

The various embodiments will hereinafter be described in conjunction with the following drawing figures, wherein like numerals denote like elements, and wherein.

DETAILED DESCRIPTION

The following detailed description is merely exemplary in nature and is not intended to limit the present disclosure or the application and uses of the present disclosure. Furthermore, there is no intention to be bound by any theory presented in the preceding background or the following detailed description. In addition, the drawings are schematic and are not drawn to scale.

Figure 1:
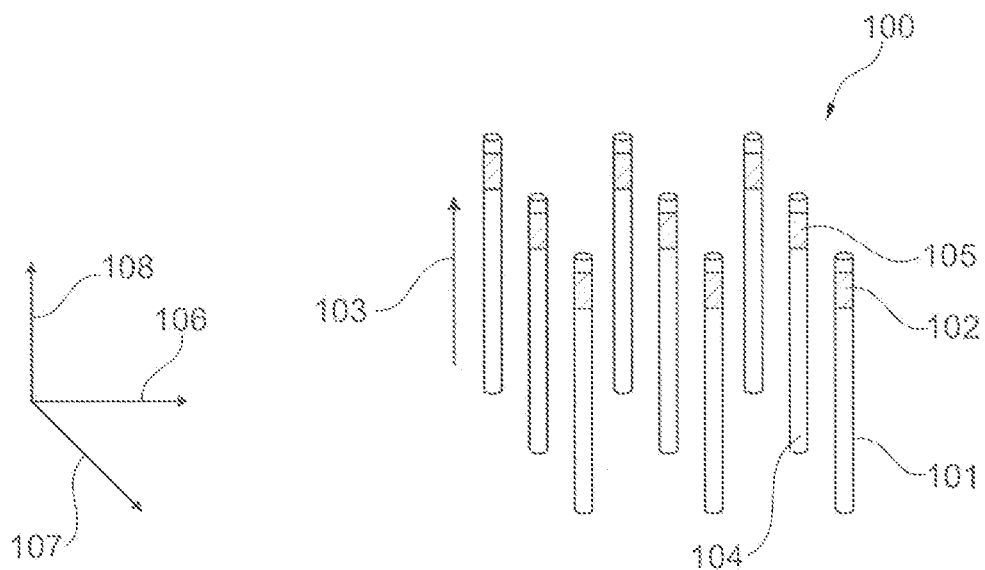
FIG. 1 shows a pin array according to an exemplary embodiment of the present disclosure.

In FIG. 1, a three-dimensional drawing of a pin array 100 is shown. The pin array 100 is aligned in a plane that is spanned by the directions 106 and 107. In this exemplary embodiment, the pin array 100 comprises three rows, wherein each row comprises three pins. A pin 101 of the first pin array 100 has a longitudinal direction 103 which is parallel to the direction 108, along which the pin 101 can be moved. Furthermore, the pin 101 comprises a binder activation device 102 for activating a binder of the semi-finished product. Equally, pin 104 comprises its own binder activation device 105. The other shown pins also comprise a respective binder activation device such that each pin is configured to activate the binder of the semi-finished product separately.

In FIGS. 2 to 11, cross-sections of preform stations according to exemplary embodiments of the present disclosure are shown. Thus, single rows or columns of the pin arrays are depicted, which may be a part of an array comprising multiple columns and/or rows.

The pins of each row may be connected by means of a flexible batten. Thus, each row of the pin array may comprise a flexible batten, on which the semi-finished product can be draped. Thus, the preform station may comprise a multitude of battens, which battens define a surface, on which the semi-finished product can be draped. Moreover, since the battens are flexible, the surface defined by the battens may be formed into the desired shape. The pins of the preform station may be movably connected to the respective flexible batten such that the position of the pin in the longitudinal direction of the batten is not fixed. For example, the pins are connected to the respective batten by means of a rail.

Figure 2:
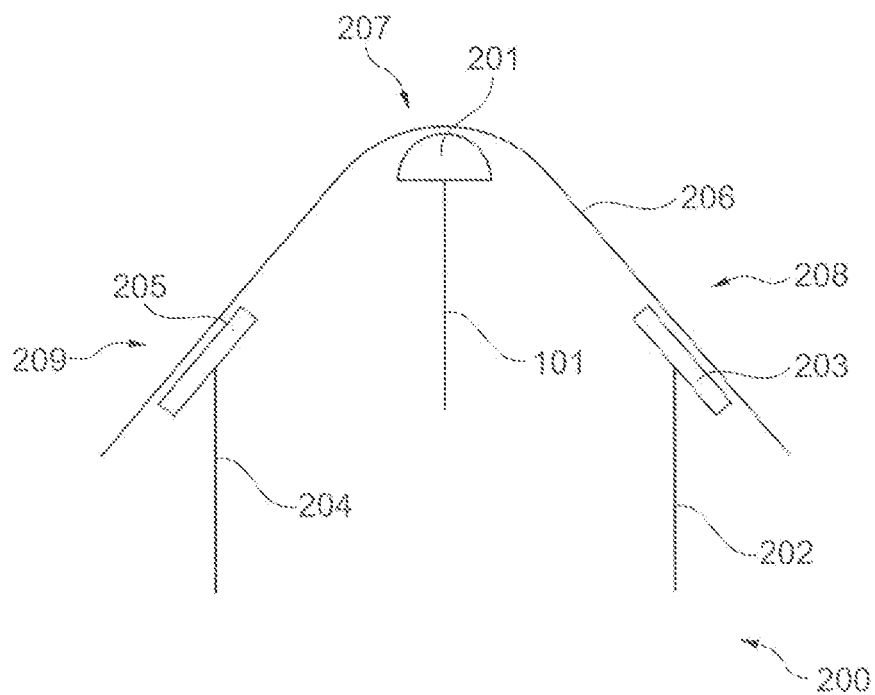
FIG. 2 shows a preform station according to an exemplary embodiment of the present disclosure.

In FIG. 2, a cross-section of the preform station 200 is shown. The preform station 200 comprises a first pin 101 with a first cap 201, a second pin 202 having a second cap 203 and a third pin 204 having a third cap 205. On the pins 101, 202 and 204 and/or on the caps 201, 203 and 205, a semi-finished product 206 is placed. The pins may be held together by a construction and/or frame, which is not shown in this exemplary embodiment, such that the pins are movable along their longitudinal directions.

The shapes of the caps 201, 203 and 205 correspond to the shape of the semi-finished product 206. For example, in the region 207, where the semi-finished product 206 has a curvature, the cap 201 has the shape of a semicircle. In the regions 208 and 209, where the geometry of the semi-finished product is substantially flat, the caps 203 and 205 are shaped as flat disks.

Figure 3:
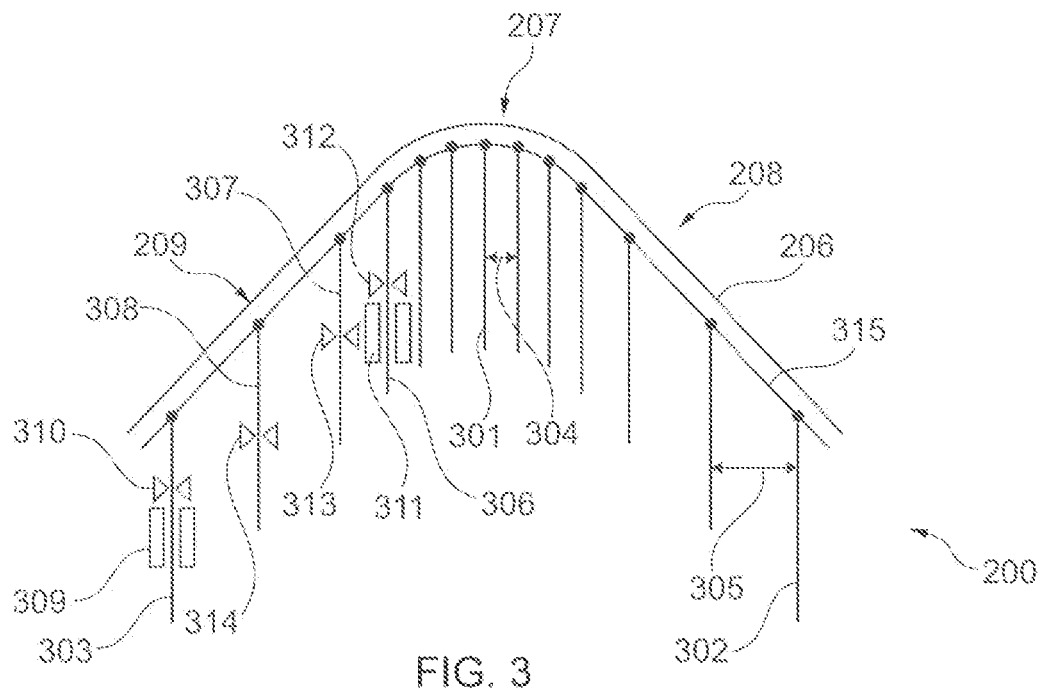
FIG. 3 shows a preform station according to an exemplary embodiment of the present disclosure.

In FIG. 3, a preform station 200 is shown. The preform station 200 comprises a multitude of pins, for example pins 301, 302, 303, 306, 307 and 308. Moreover, a flexible membrane 315 can be aligned on and/or between the pins such that the shaping movement of the pins can be continuously transferred to the semi-finished product 206.

Furthermore, the pins may have different distances to each other. In a region 207 where the shape of the semi-finished product is complex, for example where the semi-finished product has a curvature, the distance 304 between two adjacent pins can be relatively small. On the other hand, in a region 208, where the geometry of the semi-finished product 206 is less complex, for example where the semi-finished product is substantially flat, the distance 305 between two adjacent pins is larger. The same applies to the distances between pins in region 209.

Moreover, some pins may comprise an actuator for moving the pin and some pins may not comprise an actuator. For example, pins 303 and 306 comprise actuators 309 and 311 respectively. Furthermore, the pins 303 and 306 comprise holding devices 310 and 312 for fixing the pins at a specific position. The pins 307 and 308 may not comprise an actuator. For example, they are configured to move together with the pin 303 and/or 306 respectively. However, the pins 307 and 308 may comprise their own holding devices 313 and 314 such that they can be fixed to specific positions respectively and independently of pins 303 and 306.

Figure 4:
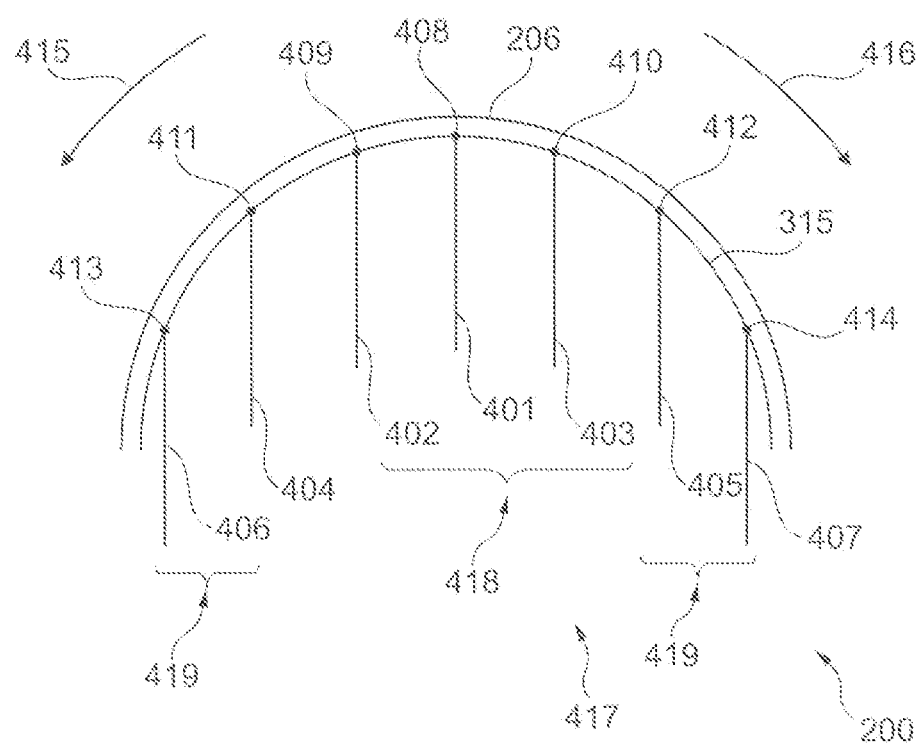
FIG. 4 shows a preform station according to an exemplary embodiment of the present disclosure.

In FIG. 4, a preform station 200 according to an exemplary embodiment of the present disclosure is shown. The preform station 200 comprises a group 407 of pins 401, 402, 403, 404, 405, 406 and 407. Furthermore, the pins 401-407 comprise fixation devices 408, 409, 410, 411, 412, 413 and 414, respectively. Furthermore, a flexible membrane 315 is aligned on and/or between the pins and a semi-finished product 206 is draped over the preform station 200.

The group 407 of pins comprises a first subgroup 418 and a second subgroup 419 of pins. The first subgroup 418 comprises the pins 401-403 and the second subgroup 419 comprises the pins 404-407. The fixation devices of the pins of the first subgroup 418 and the fixation devices of the pins of the second subgroup 419 can be activated separately. For example, the semi-finished product 206 can first be fixed to the fixation devices 408-410. Subsequently, the semi-finished product can be draped in the region of the fixation devices 408-410. Subsequently, the fixation devices of the pins of the second subgroup 419 can be activated and the semi-finished product 206 can be draped in the region of the fixation devices 411-414. Thus, a draping direction indicated by the arrows 415 and 416 is defined. This draping procedure may provide for a more precise draping and for controllable fiber angles of the semi-finished product.

Figure 5:
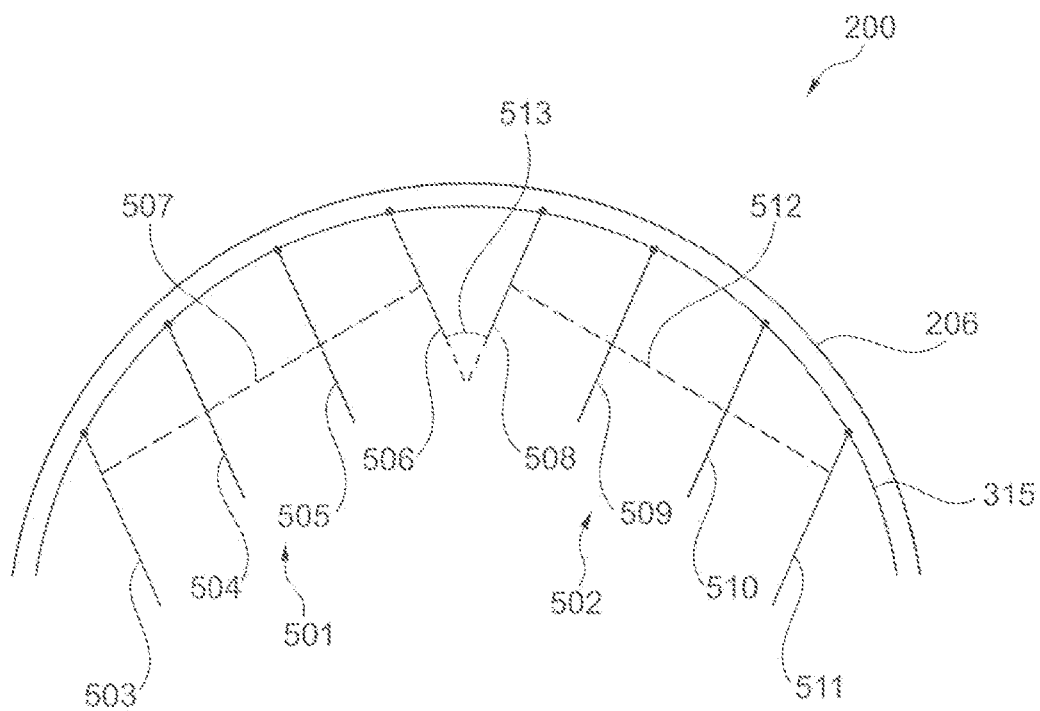
FIG. 5 shows a preform station according to an exemplary embodiment of the present disclosure.

In FIG. 5, a preform station 200 is shown, which comprises a first preform module 501 and a second preform module 502. The first preform module 501 includes pins 503, 504, 505 and 506, which are held together by a construction 507. The second preform module 502 comprises pins 508, 509, 510 and 511, which are held together by a construction 512, and a flexible membrane 315 is aligned between the pins.

The modules 501 and 502 can be translated and/or rotated with respect to each other such that complex shapes can be formed. For example, the pins of the first module 501 are substantially parallel to each other and the pins of the second module 502 are substantially parallel to each other. The pins of the first module 501 and the pins of the second module 502 enclose an angle 503, which is larger than 0, for example about 30°. In this way, geometries with great curvatures can be formed.

Figure 6:
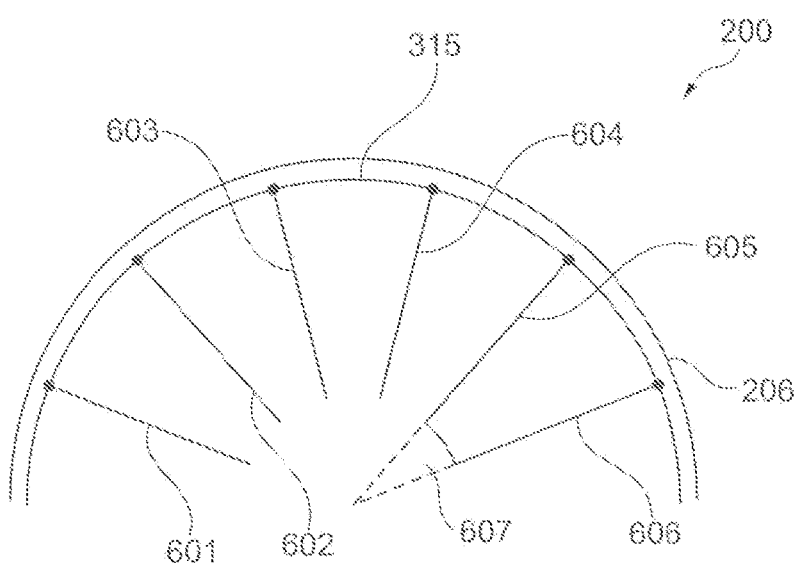
FIG. 6 shows a preform station according to an exemplary embodiment of the present disclosure.

In FIG. 6, a preform station 200 is shown, which comprises pins 601, 602, 603, 604, 605 and 606. The pins 601-606 are not aligned parallel to each other. For example, pins 605 and 606 enclose an angle 607 which is larger than 0, e.g., about 20°.

As described before, the pins are connected by means of a flexible membrane 315, on which the semi-finished product 206 can be applied.

Figure 7:
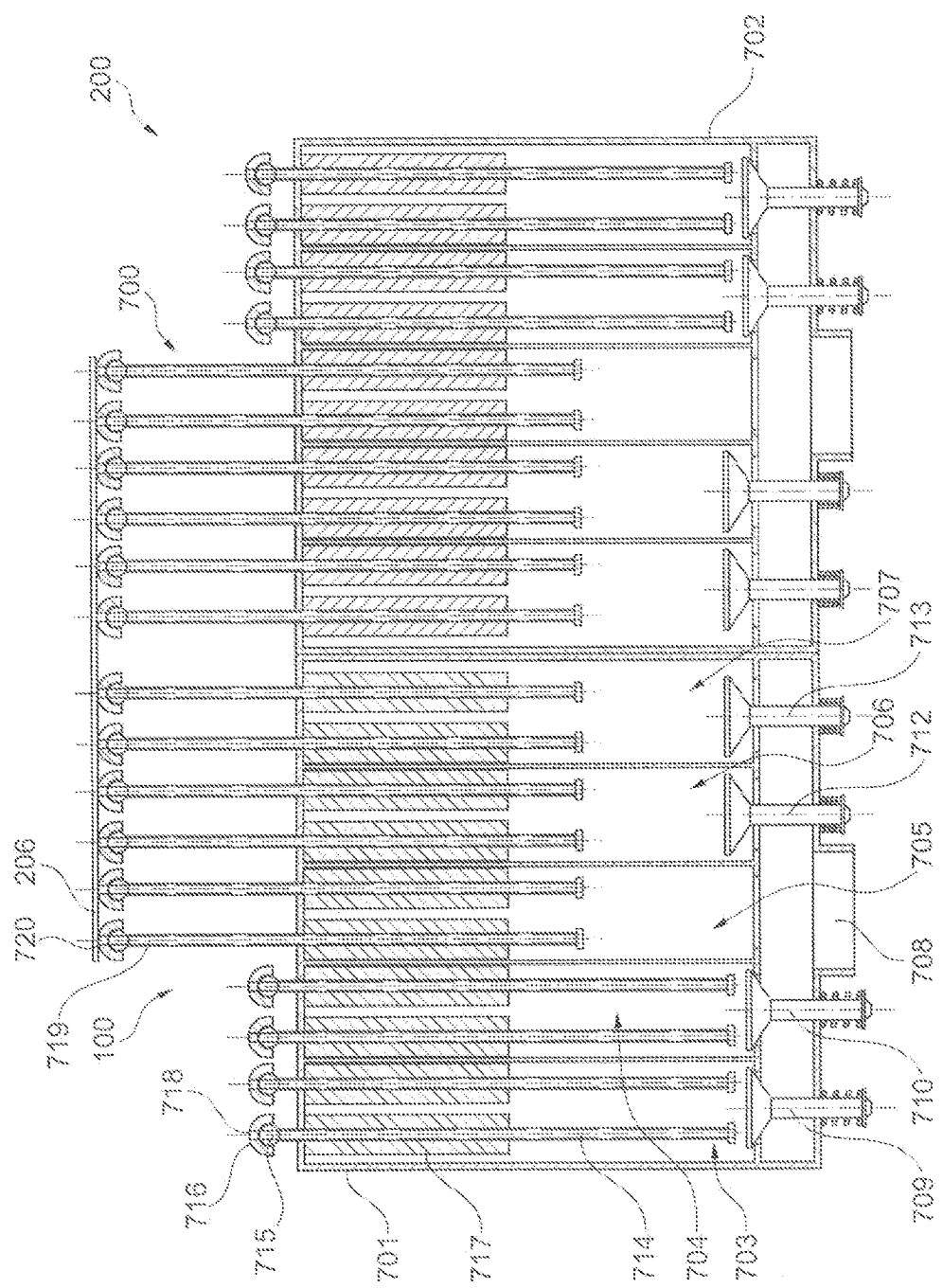
FIG. 7 shows a preform station according to an exemplary embodiment of the present disclosure.

In FIG. 7, a preform station 200 is depicted. The preform station 200 comprises a first preform module 701 and second preform module 702. The first preform module comprises a first pin array 100 and the second preform module 702 comprises a second pin array 700. Each pin array includes a multitude of pins. In this exemplary embodiment, the first preform module 701 and the second preform module 702 are aligned next to each other without having an offset between each other.

The first preform module 701 comprises chambers 703, 704, 705, 706 and 707. Each chamber has two movable pins. Furthermore, the chambers 703, 704, 706 and 707 are connected to a vacuum connection 708 by means of valves 709, 710, 712 and 713, respectively.

A pin 714 comprises an end portion 715, on which a cap 716 can be placed. Furthermore, the pin 714 can be moved by means of an actuator 717. Moreover, the pins comprise a drilling hole along the longitudinal direction of the pin. In other words, the pin 714 is designed as a tube. When a vacuum is applied to the vacuum connection 708, the vacuum can be transmitted to the chambers 703-707 by means of the valves 709-713. If the vacuum is transmitted to the chamber 703 by means of the valve 709, the vacuum is also transmitted through the pin to the end portion of the pin. Furthermore, the cap 716 also comprises a hole 718 such that the cap can apply a vacuum on the semi-finished product 206. If the cap and/or the pin 714 is not covered by the semi-finished product 206, the valve 709 can be closed such that no vacuum is transmitted to the chamber 703. In this case, the vacuum would only be transmitted to the chambers 705, 706 and 707. For example, the vacuum is transmitted to the cap 720 of the pin 719 such that the cap 720 sucks the semi-finished product 206 in order to fix the semi-finished product 206 to the pin 719 and/or to the cap 720. The other pins may be built up as described within the application. A pin may thus comprise a fixation device that can be turned on or turned off by opening or closing the respective valve.

Furthermore, in FIG. 7 it is shown that the semi-finished product 206 is draped on a multitude of pins. The pins are all in the same position such that the semi-finished product 206 can be draped on a flat plane.

Figure 8:
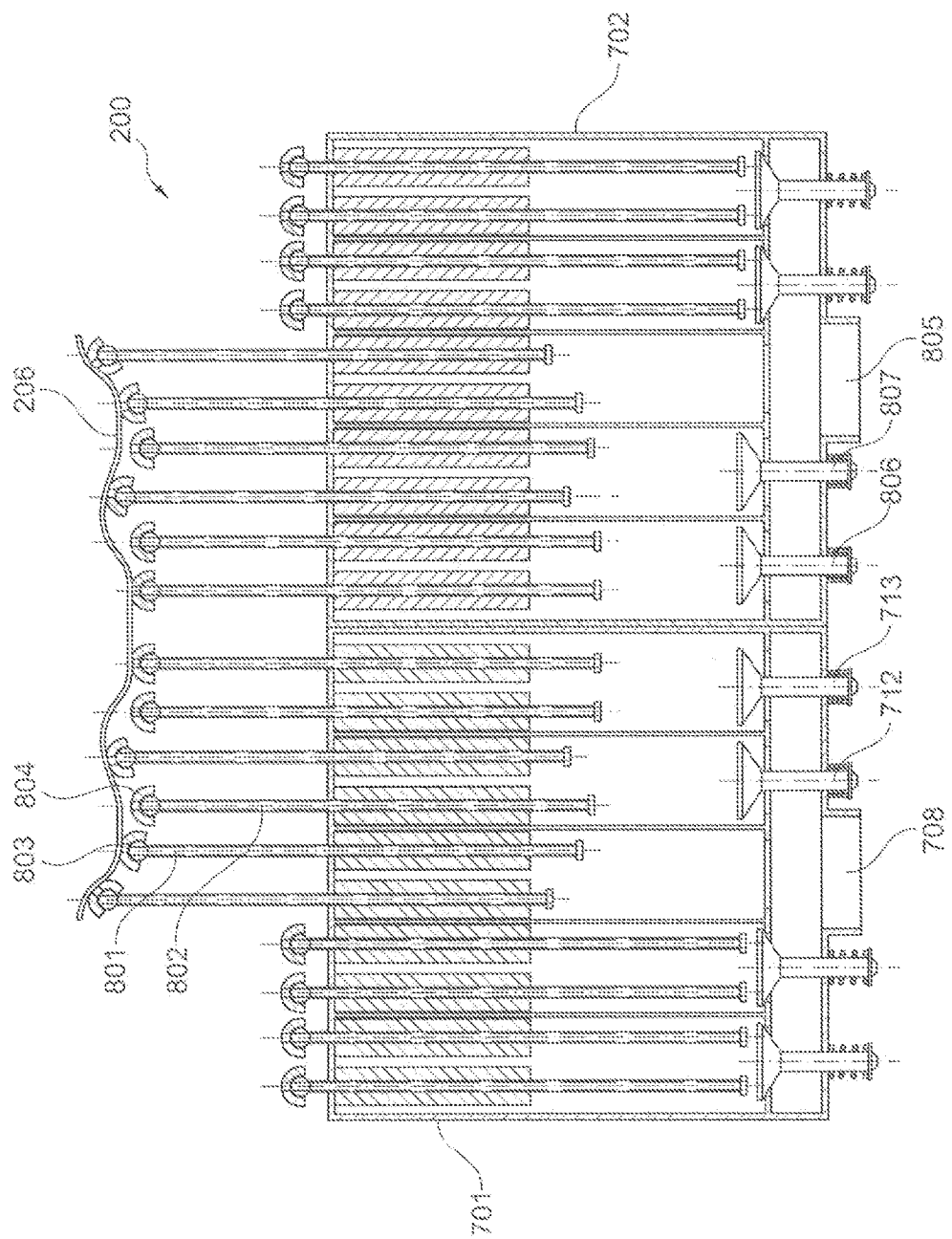
FIG. 8 shows a preform station according to an exemplary embodiment of the present disclosure.

FIG. 8 shows a preform station 200 according to an exemplary embodiment when the flexible semi-finished product is formed and/or shaped to a desired geometry. It can be gathered that the pins are moved to different positions with respect to each other. Furthermore, some pins are in contact with the semi-finished product and some pins are not in contact with the semi-finished product 206. For example, the cap 803 of the pin 801 is in contact with the semi-finished product 206 and the cap 804 of the pin 802 is not in contact with the semi-finished product 206.

Figure 9:
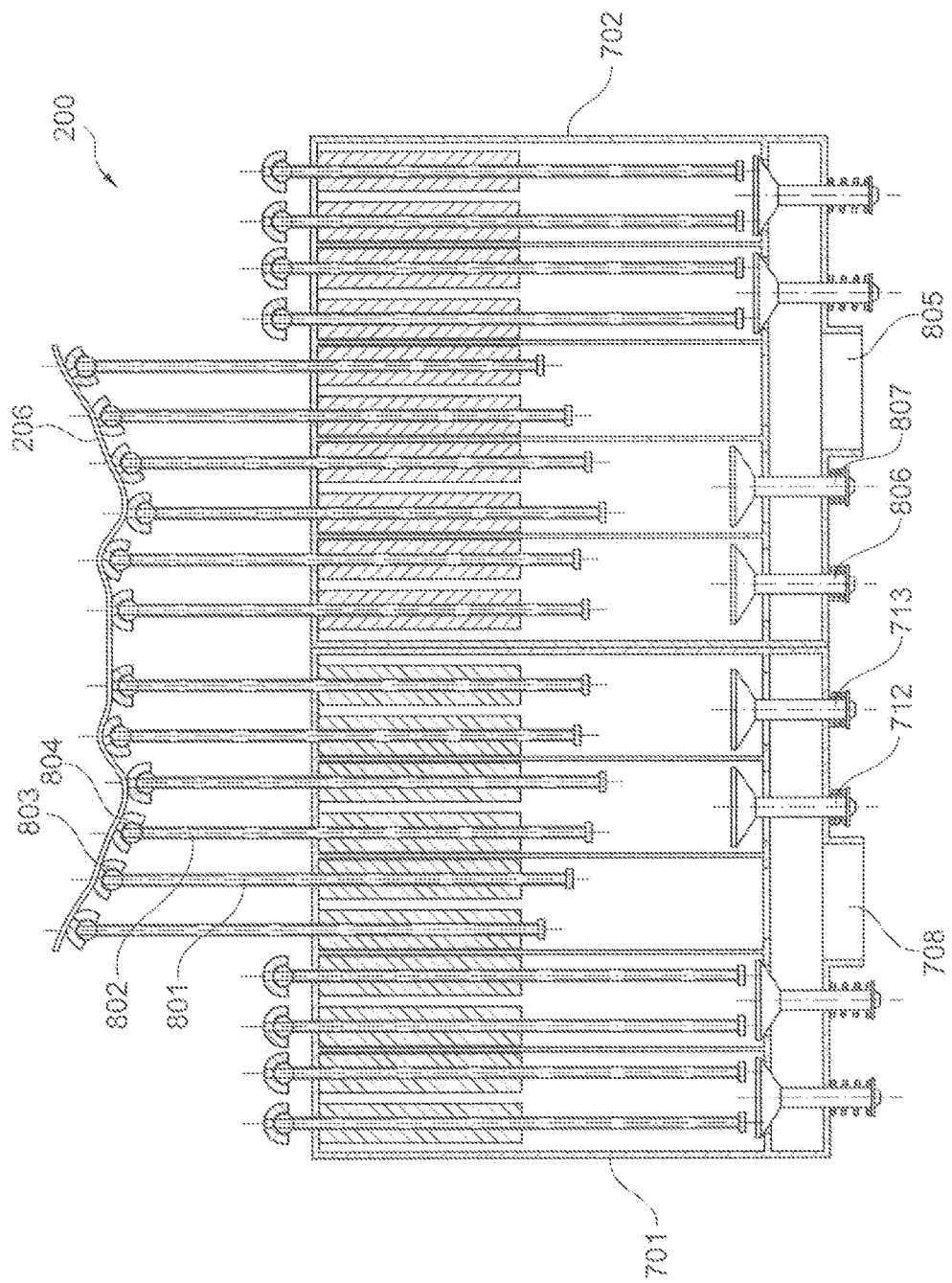
FIG. 9 shows a preform station according to an exemplary embodiment of the present disclosure.

In FIG. 9, a preform station 200 in a subsequent step of the forming process according to an exemplary embodiment is shown. In this step, a vacuum is applied to the vacuum connections 708 and 805. Furthermore, the valves 712, 713, 806 and 807 are opened such that the vacuum is transmitted to the pins, on which the flexible semi-finished product 206 is draped. Thus, each pin, on which the semi-finished product 206 is applied, sucks the semi-finished product such that the semi-finished product is fixed to the pins and/or to the caps of the pins. For example, both, caps 803 and 804 of pins 801 and 802 are in contact with the semi-finished product 206.

Figure 10:
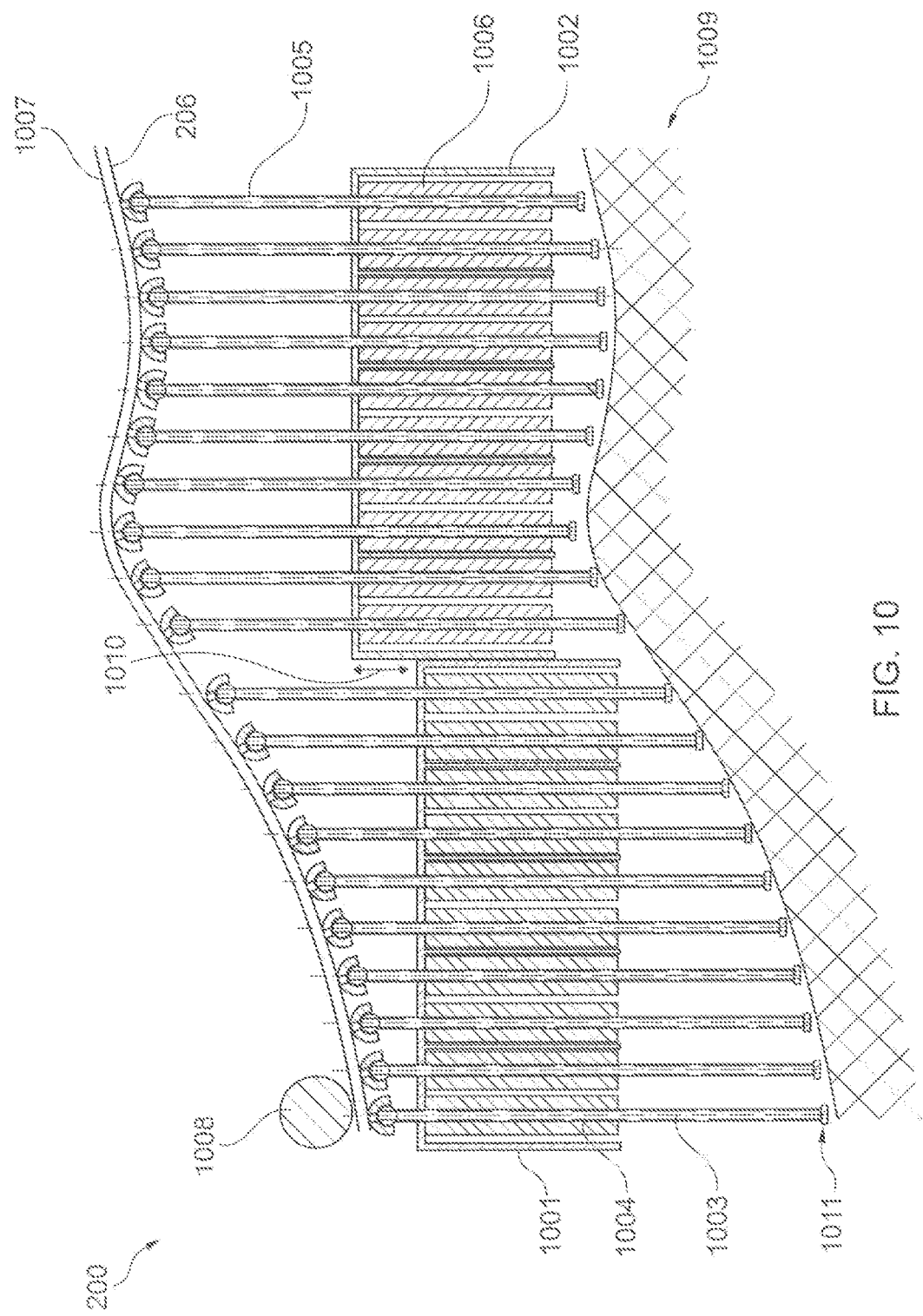
FIG. 10 shows a preform station according to an exemplary embodiment of the present disclosure.

In FIG. 10, a preform station 200 according to an exemplary embodiment of the present disclosure is depicted. The preform station 200 includes a first preform module 1001 and a second preform module 1002, which each comprise a multitude of pins. In this exemplary embodiment, the first preform module 1001 and the second preform module 1002 are aligned with an offset 1010 to each other. The first preform module 1001 comprises for example a pin 1003 which is movable by means of an actuator 1004. The second preform module 1002 includes a pin 1005 that is movable by means of an actuator 1006.

Moreover, the pins may also be moved by exerting a pressure onto an end portion 1011 of the pins. For example, the end portions 1011 of the pins can be pressed against a mold 1009 that defines the geometry to be achieved for the semi-finished product 206.

Furthermore, a membrane 1007 can be applied onto the semi-finished product. Moreover, the semi-finished product 206 can be draped by means of a roller 1008 or any other appropriate tool for draping the semi-finished product 206.

Figure 11:
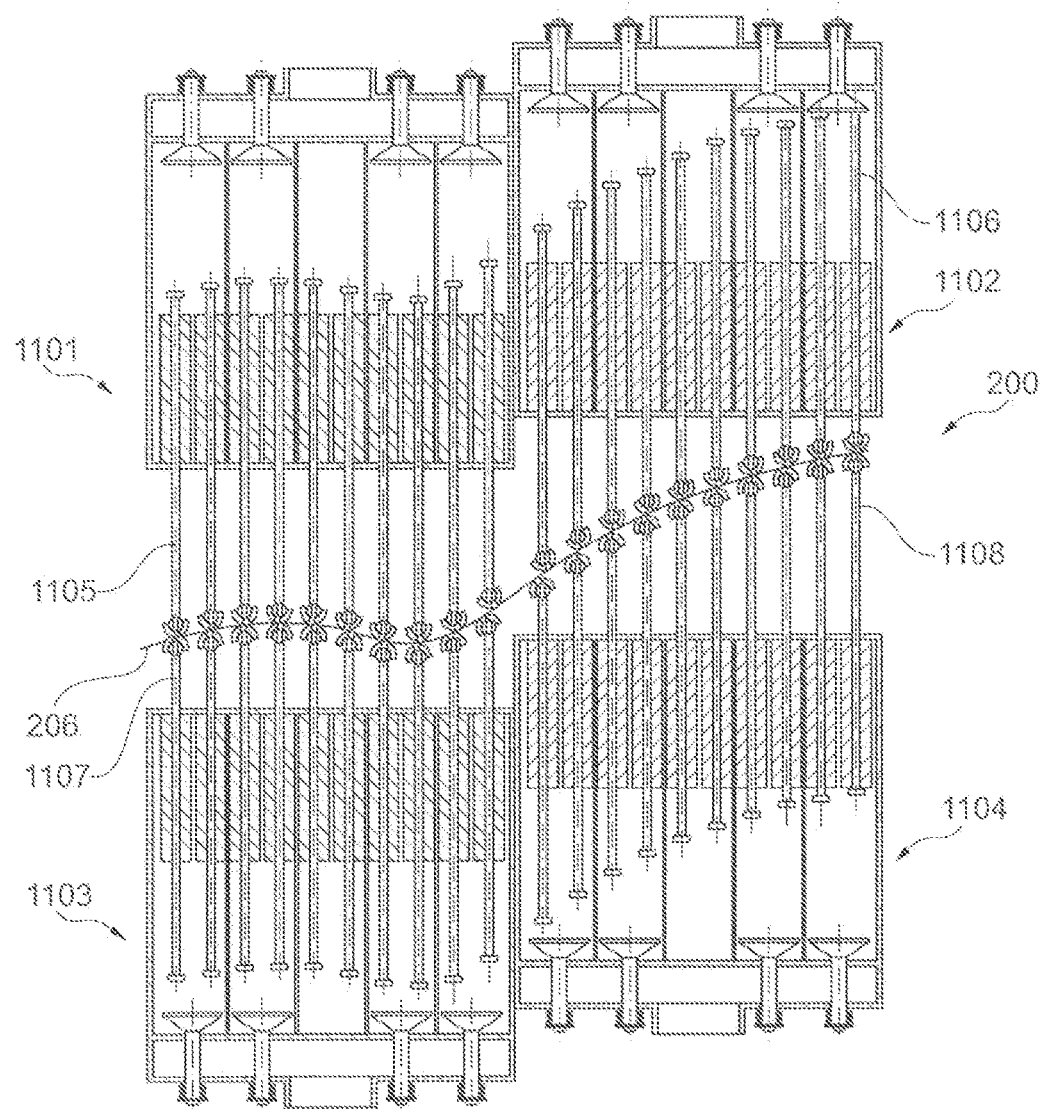
FIG. 11 shows a preform station according to an exemplary embodiment of the present disclosure.

In FIG. 11, a preform station comprising preform modules 1101, 1102, 1103 and 1104 is shown. Furthermore, the preform module 1101 comprises a pin 1105, the preform module 1102 comprises a pin 1106, the preform module 1103 comprises a pin 1107 and the preform module 1104 comprises a pin 1108.

The preform modules 1101-1104 are aligned such that the pins of the preform modules 1101 and 1102 face the pins of the preform modules 1103 and 1104. For example, the pin 1105 faces the pin 1107 and the pin 1106 faces the pin 1108. The semi-finished product 206 is placed and/or sandwiched between the pins such that the pins are aligned on both sides of the semi-finished product 206.

Figure 12:
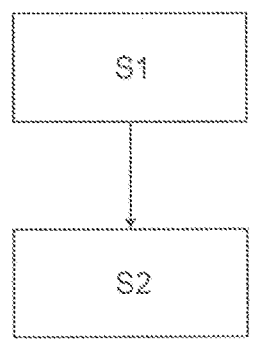
FIG. 12 shows a flowchart according to an exemplary embodiment of the present disclosure.

FIG. 12 shows a flowchart of a method according to an exemplary embodiment of the present disclosure. S1 refers to draping the flexible semi-finished product onto a first pin array of a preform station, which is described within this application. Furthermore, S2 refers to activating a binder of the semi-finished product by means of the binder activation system of the preform station.

Furthermore, the method may also comprise steps described in this application with reference to the method and the preform station.

Figure 13:
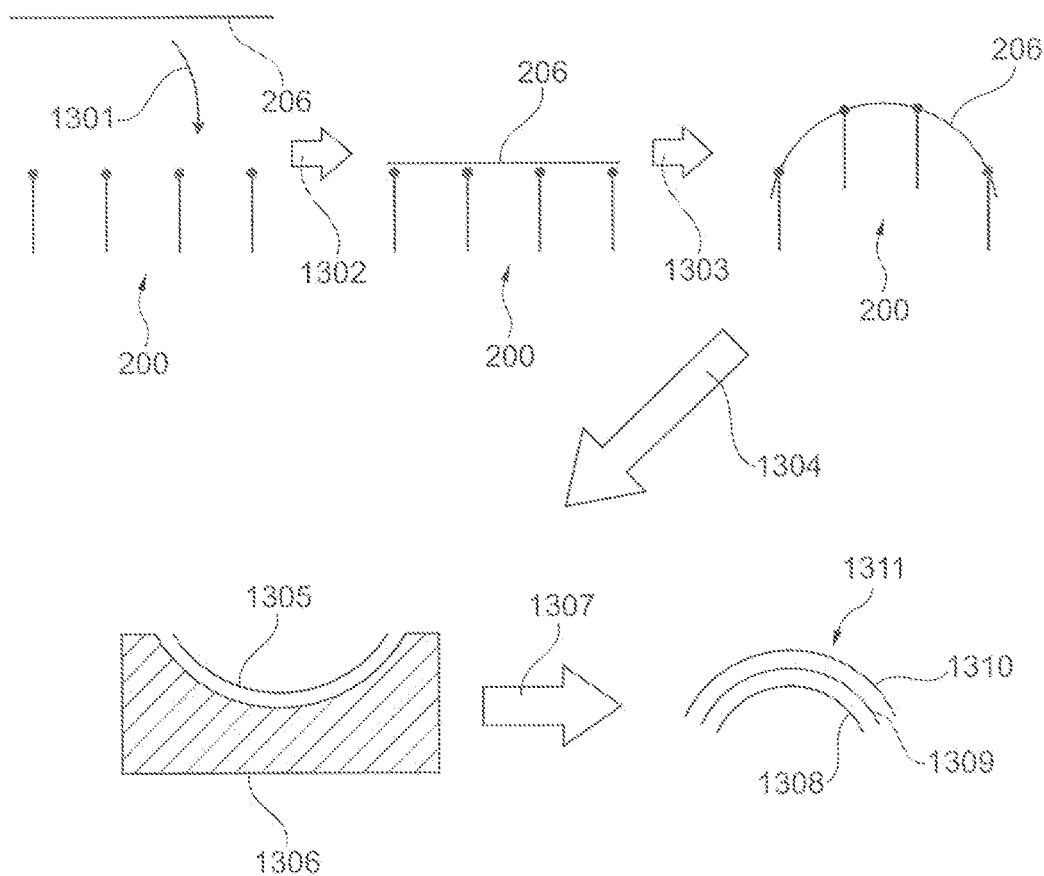
FIG. 13 shows a manufacturing process of a preform according to an exemplary embodiment of the present disclosure.

In FIG. 13, a process of manufacturing a preform is shown. First, a flexible semi-finished product 206 is placed onto a preform station 200. The process of placing the semi-finished product onto the preform station 200 is indicated by the arrow 1301. Subsequently, the flexible semi-finished product is shaped into a desired geometry and the binder of the semi-finished product 206 is activated such that the semi-finished product 206 is transformed into a geometrically stable preform 1305. The geometrically stable preform is then transferred into a curing mold 1306 for curing. Multiple preforms 1308, 1309 and 1310 can be manufactured, which constitute plies of a component 1300. Moreover, multiple plies of semi-finished product may also be draped onto the preform station 200. An order of process steps may be indicated by the arrows 1302, 1303, 1304, and 1307.

Figure 14A:
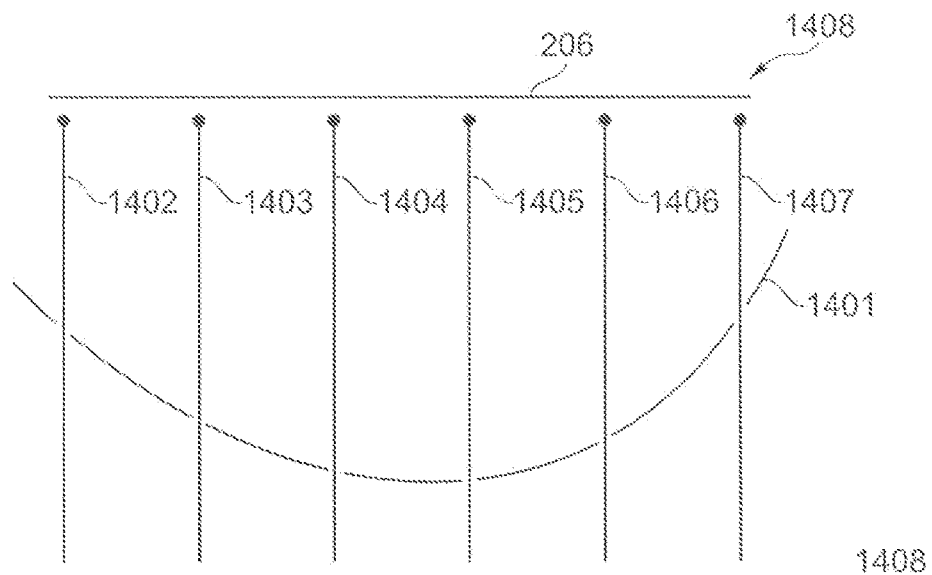
FIG. 14A shows a preform station according to an exemplary embodiment of the present disclosure.
Figure 14B:
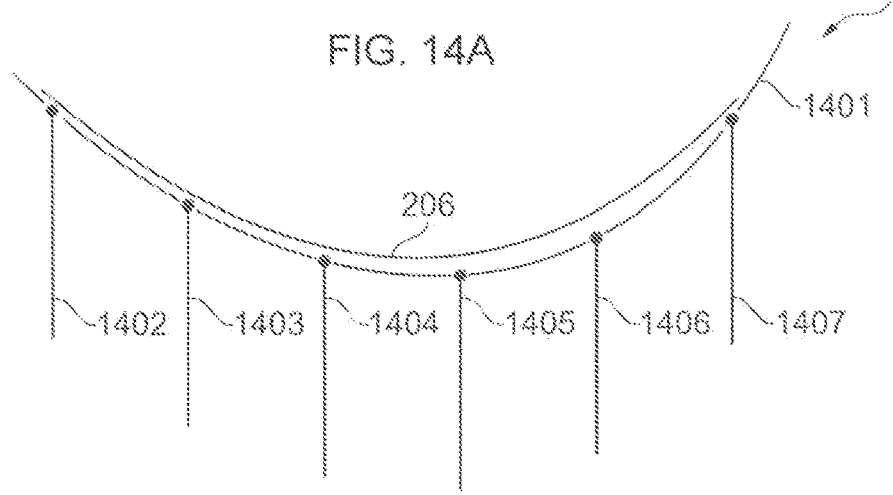
FIG. 14B shows a preform station according to an exemplary embodiment of the present disclosure.

FIGS. 14A and 14B show a preform station 1408 according to an exemplary embodiment of the present disclosure. The preform station 1408 comprises a pin array having pins 1402, 1403, 1404, 1405, 1406 and 1407. Moreover, the preform station comprises a curing mold 1401 defining the shape of the preform, whereby the pins 1402 to 1407 pierce through respective openings in the curing mold. In other words, the curing mold 1401 comprises a multitude of openings. Each pin of the pins 1402 to 1407 of the preform station 1408 is arranged to pass through the respective opening. Moreover, the caps of the pins are designed or configured to close the respective opening such that the mold has a smooth surface, when the pins 1402 are retracted into the mold 1401 as can be gathered in FIG. 14B.

In a step of the draping process, the pins 1402 to 1407 are aligned in a plane and the semi-finished product 206 is draped onto the pins 1402 to 1407. Subsequently, the pins 1402 to 1407 are retracted into the curing mold 1401. Now, the semi-finished product 206 is in contact with the curing mold 140. The pins 1402 to 1407 may seal the openings of the curing mold such that the semi-finished product can be treated with a binder.

Figure 15:
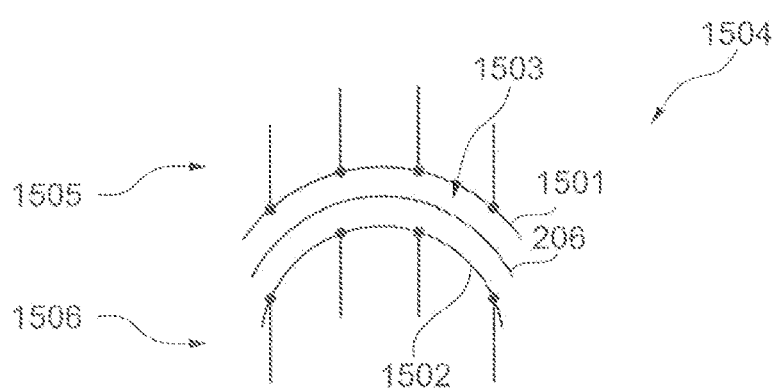
FIG. 15 shows a preform station according to an exemplary embodiment of the present disclosure.

FIG. 15 shows a preform station 1504 according to an exemplary embodiment of the present disclosure. The preform station comprises a first pin array 1505 and a second pin array 1506, wherein the pins of the pin array 1505 face the pins of the pin array 1506. Moreover a membrane 1501 is aligned on the pin array 1505 and a membrane 1502 is aligned on the pin array 1502. A semi-finished product is draped onto the membrane 1502 and is located between the membranes 1501 and 1502. In other words, the semi-finished product is sandwiched between the pin array 1505 and 1506. A vacuum can be applied to the space 1503 between the membranes 1501 and 1502. In order to apply a vacuum, the preform station 1504 may be placed in a pressure chamber. Because of the vacuum, the membranes 1501 and 1502 exert a pressure onto the semi-finished product 206. In this way, the fiber directions of the semi-finished product 206 can be precisely and controllably aligned.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the present disclosure in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the present disclosure as set forth in the appended claims and their legal equivalents.

What is claimed is:

1. A preform station for draping a flexible semi-finished product and for transforming the flexible semi-finished product into a geometrically stable preform, comprising:
   a first pin array including a plurality of pins, on which the flexible semi-finished product is draped, each pin of the plurality of pins having a longitudinal direction and each pin of the plurality of pins is movable along the longitudinal direction for forming the flexible semi-finished product; and
   a binder activation system for activating a binder of the flexible semi-finished product when the flexible semi-finished product is draped onto the first pin array, thereby transforming the flexible semi-finished product into the geometrically stable preform;
   wherein a first pin of the first pin array comprises a first actuator for moving the first pin along the longitudinal direction;
   wherein the first pin of the first pin array comprises a first holding device configured to fix a position of the first pin;
   wherein a second pin of the first pin array is coupled to the first pin and is not directly coupled to a dedicated actuator for moving the second pin such that said first actuator is configured to move the second pin together with the first pin when the first actuator moves the first pin, and
   wherein the second pin of the first pin array comprises a second holding device configured to fix a position of the second pin independently of the first pin.

2. The preform station according to claim 1, wherein the binder activation system is selected from a group comprising a heating device, an ultrasound emitting device, and a fan.

3. The preform station according to claim 1, wherein the binder activation system comprises at least one binder activation device that is associated with a pin of the first pin array.

4. The preform station according to claim 1, wherein at least one pin of the first pin array comprises a cap, which is connected to an end of the at least one pin.

5. The preform station according to claim 1, wherein the first pin of the first pin array comprises a first cap and the second pin of the first pin array comprises a second cap, and the first cap has a different shape than the second cap wherein the shape of the first cap and the shape of the second cap correspond to a geometry to which the semi-finished product is to be formed.

6. The preform station according to claim 1, wherein a pin of the first pin array comprises a cap that changes shape when the cap is heated to a specific temperature.

7. The preform station according to claim 1, wherein a pin of the first pin array comprises a fixation device for fixing the semi-finished product to the pin.

8. The preform station according to claim 1, wherein each of the plurality of pins of the first pin array include a fixation device for fixing the semi-finished product to the respective pin wherein the preform station is adapted to activate a first subgroup of pins of the plurality of pins of the first pin array to fix a first region of the semi-finished product and to subsequently activate a second subgroup of pins of the plurality of pins of the first pin array to fix a second region of the semi-finished product.

9. The preform station according to claim 1, further comprising:
   a first preform module comprising the first pin array and a second preform module comprising a second pin array comprising a second plurality of pins, on which the flexible semi-finished product is draped;
   wherein the first preform module and the second preform module are movable with respect to each other.

10. The preform station according to claim 8, wherein the fixation devices of the first subgroup of pins are controllable independently of the fixation devices of the second subgroup of pins such that the semi-finished product is fixed to the first subgroup of pins and to the second subgroup of pins independently of each other.

11. The preform station according to claim 1, wherein the binder activation system is an ultrasound emitting device.

12. A preform station for draping a flexible semi-finished product and for transforming the flexible semi-finished product into a geometrically stable preform, the preform station comprising:
   a module including a wall formed with apertures, wherein the module encloses sealable chambers;
   an array of pins on which the flexible semi-finished product is draped, wherein each pin is movable for forming the flexible semi-finished product, wherein each pin is located in a respective chamber of the module and passes through a respective aperture in the wall of the module, wherein each pin has a bottom end, a top end, and a hole extending from the bottom end to the top end;
   a vacuum connection selectively coupled to each chamber through a respective valve, wherein when the vacuum connection applies a vacuum to a selected chamber, the hole in each pin in the selected chamber applies a vacuum on the semi-finished product; and
   a binder activation system for activating a binder of the flexible semi-finished product when the flexible semi-finished product is draped onto the pins, thereby transforming the flexible semi-finished product into the geometrically stable preform.

13. The preform station of claim 12 wherein each pin includes a cap at the respective top end, wherein each cap is heat deformable from a flat disk shape to a semicircle shape.

* * * * *